US011965492B1

(12) United States Patent
Hansen et al.

(10) Patent No.: US 11,965,492 B1
(45) Date of Patent: Apr. 23, 2024

(54) SHAPE MEMORY ALLOY COMPOSITE FABRIC PRESSURE VESSEL AND DIVING SUIT

(71) Applicant: The Government of the United States of America as represented by the Secretary of the Navy, Newport, RI (US)

(72) Inventors: Thomas E Hansen, Newport, RI (US); Lewis B Shattuck, IV, Newport, RI (US); Simon E Freeman, Portsmouth, RI (US); Rylan C King, Burke, VA (US)

(73) Assignee: The United States of America as represented by the Secretary of the Navy

( * ) Notice: Subject to any disclaimer, the term of this patent is extended or adjusted under 35 U.S.C. 154(b) by 499 days.

(21) Appl. No.: 17/381,231

(22) Filed: Jul. 21, 2021

(51) Int. Cl.
| | |
|---|---|
| *F03G 7/06* | (2006.01) |
| *B32B 5/22* | (2006.01) |
| *B63B 3/14* | (2006.01) |
| *B63B 5/24* | (2006.01) |
| *B63C 11/04* | (2006.01) |
| *D03D 15/00* | (2021.01) |

(52) U.S. Cl.
CPC .......... *F03G 7/06143* (2021.08); *B63C 11/04* (2013.01); *D03D 15/00* (2013.01); *B32B 5/22* (2013.01); *B63B 3/14* (2013.01); *B63B 2005/242* (2013.01); *D10B 2401/02* (2013.01); *D10B 2401/046* (2013.01); *D10B 2401/06* (2013.01)

(58) Field of Classification Search
CPC ..... F03G 7/06143; B63C 11/04; D03D 15/00; B32B 5/22; B63B 3/14; B63B 2005/242; D01B 2401/02; D01B 2401/046; D01B 2401/06; D01B 240/02; D01B 240/046; D01B 240/06
See application file for complete search history.

(56) References Cited

U.S. PATENT DOCUMENTS

| | | | | |
|---|---|---|---|---|
| 4,241,763 A | * | 12/1980 | Antal | F16L 11/127 442/13 |
| 7,841,289 B1 | * | 11/2010 | Schanz | B65D 90/10 114/256 |
| 2009/0236004 A1 | * | 9/2009 | Jani | F16L 11/083 138/125 |
| 2015/0096642 A1 | * | 4/2015 | Lengyel | D04C 1/02 138/124 |

* cited by examiner

*Primary Examiner* — Stephen P Avila
(74) *Attorney, Agent, or Firm* — James M. Kasischke; Michael P. Stanley; Jeffry C. Severson

(57) ABSTRACT

A shape memory alloy composite fabric and a method of use is provided in underwater pressure vessels and as flexible joints in atmospheric diving suits. The atmospheric diving suit internal pressure is one atmosphere for underwater transit to and from an underwater work site. During operations at a work site, the shape memory alloy joints transform to a martensite phase and enable greater flexibility while the pressure in the atmospheric diving suit equalizes with ambient depth pressure.

11 Claims, 10 Drawing Sheets

Diving
$P_{suit} < P_{hyd}$

Working
$P_{suit} = P_{hyd}$

Surfacing
$P_{suit} > P_{hyd}$

SHAPE MEMORY ALLOY COMPOSITE FABRIC PRESSURE VESSEL AND DIVING SUIT

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

1) Field of the Invention

The invention relates to pressure vessels and specifically an underwater diving suit.

(2) Description of the Related Art

Some diving operations require long transits at depth. Conventional gear for such long transits include diving bells and atmospheric diving suits (ADS). The use of conventional gear limits the duration of dives and diver mobility as well as requiring ancillary equipment for the dives.

A conventional ADS is a one-person articulated anthropomorphic submersible with pressure joints that allow articulation while maintaining an internal pressure of one atmosphere. The articulatable joints in the arms and legs do not contain shape memory alloys. Conventional ADS allows the diver to descend deep underwater without the hazards associated with traditional diving methods. An example of a conventional ADS 26 is shown in the prior art view of FIG. 1. In the figure, the ADS 26 connects via an umbilical cable 46 to a surface vessel 48. The umbilical cable 46 supplies breathing gas, electrical power and communications to the human being in the ADS 26.

The ADS 26 includes hollow arm spaces with pressure resistant joints to carry manually-operated manipulators and hollow leg spaces that are similarly articulated for locomotion. Joint seals allow articulation while maintaining internal pressure. The ADS 26 isolates the human being occupant from the pressure of the underwater environment.

The conventional ADS 26 includes a plurality of articulable rotary joints on each arm portion and leg portion. In the illustrated ADS 26, there are four articulable rotary arm joints 27, 28, 29 and 30 for a right arm portion 38, four articulable rotary arm joints 27, 28, 29 and 30 for a left arm portion 40, four articulable rotary leg joints 31, 32, 33 and 34 for a right leg portion 42 and four articulable rotary leg joints 31, 32, 33 and 34 for a left leg portion 44. Other conventional ADS may use other joints in each arm and leg portion. The arm joints or leg joints in the conventional ADS 26 do not have shape memory alloys that change from martensite to austenite or vice versa during operation of the ADS 26.

While using the ADS 26, the diver performs work as well as traveling to and from the place where the work is being done. These functions require sufficient mobility, dexterity and sensory input with the work in an ADS 26 limited by the construction of the suit.

Potential solutions exist, but the solutions fail to solve the challenge in an operationally effective way due to limited degrees of freedom, the requirement of constant volume, and the high complexity leading to reliability concerns. Although new bendable joints have the potential to mitigate these issues, compromises to mobility and maneuverability, still exist as long as a maneuverable and rigid exoskeleton is required. As such, a need exists for diving gear that overcomes the limitations of conventional ADS diving suits.

BRIEF SUMMARY OF THE INVENTION

A pressure vessel is provided for underwater use in which the vessel includes a shape memory alloy (SMA) composite fabric having a martensite phase and an austenite phase.

In the martensite phase, the SMA composite fabric is elastic. In the austenite phase, the SMA composite fabric is rigid to form the pressure vessel with the pressure vessel defining an interior volume large enough to contain an adult human. The shape memory alloy composite fabric can withstand ambient hydrostatic pressure at the water depth where the pressure vessel is deployed.

In another embodiment, a hybrid atmospheric diving suit includes an articulated anthropomorphic submersible diving suit having a plurality of joints in a right arm, a left arm, a right leg and a left leg portion of the diving suit. At least one of the joints includes a shape memory alloy composite fabric. Each of the right arm, the left arm, the right leg and the left leg portions of the suit includes one or more joints made of the shape memory alloy composite fabric.

The shape memory alloy composite fabric joints are rigid in an austenite phase to maintain a pressure of one atmosphere in an interior of the suit. The shape memory alloy composite fabric joints are flexible in a martensite phase to enable freedom of movement in the joints.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Pressure vessels and diving suits may be made with SMAS (shape memory alloys). The shape memory alloys are components of a fabric used to make the pressure vessels and diving suits. The SMA composite fabric suit prioritizes maneuverability and lightness; yet still offers a traditional atmospheric diving suit in a compact, foldable, woven hyperbaric fabric-based design.

The manufacture and functionality of shape memory alloys are known. Shape memory alloys exhibit a crystallographically reversible martensitic transformation. At high temperatures, the shape memory alloy exists as an austenite phase (the parent or memory phase) with a long range order. Upon cooling below a transformation temperature, the austenite transforms to a thermoelastic martensite whose structure has numerous variants, typically sheared platelets.

Because the martensitic structure is self-accommodating, the deformation or transformation to martensite is zero. The martensite deforms by a twinning mechanism that transforms the different variants to the variant that can accommodate maximum elongation in the direction of an applied force. The interfaces between platelets in the martensite phase slip very readily and the material deforms at low applied stresses. The austenite phase has only one possible orientation. Thus, when heated, the deformed structures of the martensite phase revert to this orientation of the austenite memory phase and the material recovers an original shape.

The transformation temperature is a function of the alloy type, composition and the applied thermomechanical treatments. Alloys with transformation temperatures below −100 C and above 150 C are known. The heating and cooling transformations do not overlap and the transformation exhibits hysteresis. The magnitude of the hysteresis varies with the alloy type and is typically in the range of 10 C-50 C.

Examples of shape memory alloys are Nitinol, which may have a hysteresis as low as 15 degrees Centigrade; and Copper-Zinc, which may have a hysteresis as low as 10 degrees Centigrade. Other shape memory alloys include Silver-Cadmium and Gold-Cadmium.

Shape memory alloys change shape to a pre-set memory geometry (austenite phase) upon the application of heat, such as an electrical current or an exothermic chemical reaction. Shape memory alloys are available in thin-gauge wire form and may be interwoven into a fabric material that enables freedom of movement when the shape memory alloys are not activated (martensite phase).

When electrically activated (heated), the shape memory alloys fibers become rigid and conform to a pre-determined shape. This shape memory alloy composite fabric material, along with a waterproof coating, offers minimal mobility restriction when disengaged but stiffens into a rigid pressure vessel when activated.

Figure 2:
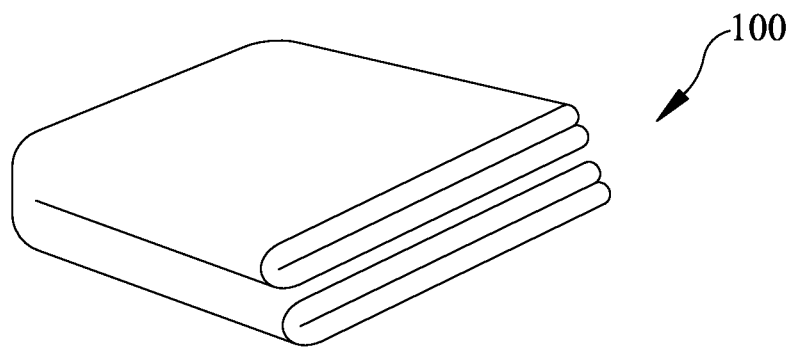
FIG. 2 is a shape memory alloy pressure vessel in the martensite phase.

The shape memory alloys may be used to construct an emergency pressure vessel of a size to accommodate an adult human. The emergency pressure vessel may also be used as a decompression chamber. As shown in FIG. 2, in the elastic, martensite phase, the SMA pressure vessel 100 is foldable for storage. In one example, the folded pressure vessel 100 may be stored in an underwater vessel for emergency use.

Figure 3:
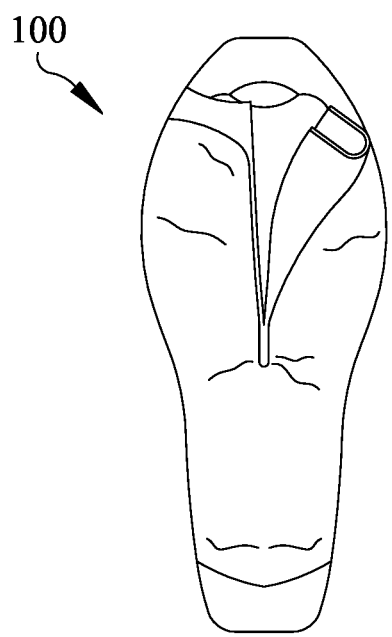
FIG. 3 is a depiction of the pressure vessel as the pressure vessel transforms to the austenite phase.

As shown in FIG. 3, when removed from storage, the pressure vessel 100 transforms to a memory phase (austenite), such as a sphere, cylinder or another shape in which a human can fit comfortably. The hardening vessel 100 with the human inside may be ejected from the underwater vessel where the shape memory alloy fully hardens to the austenite phase. Supplemental oxygen may be included inside the vessel 100. Because the vessel 100 is filled with air at one atmosphere pressure, the vessel floats to the surface for eventual retrieval.

The shape memory alloy composite fabric of the pressure vessel 100 may be in the martensite phase at a temperature below the ocean water temperature of 4 to 20 degrees Centigrade and so may be stored in a suitable cooled compartment in the underwater vessel. Then, when exposed to the ambient air in the underwater vessel and subsequently the ocean water; the shape memory alloy in the fabric of the pressure vessel 100 transforms to the austenite or memory phase. In the austenite phase, the shape memory alloy is rigid such that the composite fabric of the pressure vessel 100 can withstand the ambient hydrostatic pressure of the ocean water.

Alternatively, the pressure vessel 100 may be stored at the ambient temperature in the underwater vessel and supplied with an optional heating source. The optional heating source may be a battery bank that is wired to the shape memory alloy in the pressure vessel 100 or an exothermic chemical heat source. When the pressure vessel 100 is unfolded, the shape memory alloy is heated by electrical current from the battery bank until the shape memory alloy become rigid and transforms to the austenite phase. The heating source maintains the shape memory alloy in the austenite phase as the pressure vessel 100 with the human inside floats to the water surface for retrieval.

As an expeditionary pressure vessel or decompression chamber, the shape memory alloy only needs to statically maintain shape so that the pressure vessel 100 can be stored at one temperature cooler than typical water temperatures (4 to 20 deg C) and transform shapes as affected by an ambient water temperature. Alternatively, the pressure vessel 100 may be stored at room temperature and deployment involves a heating system.

Figure 4:
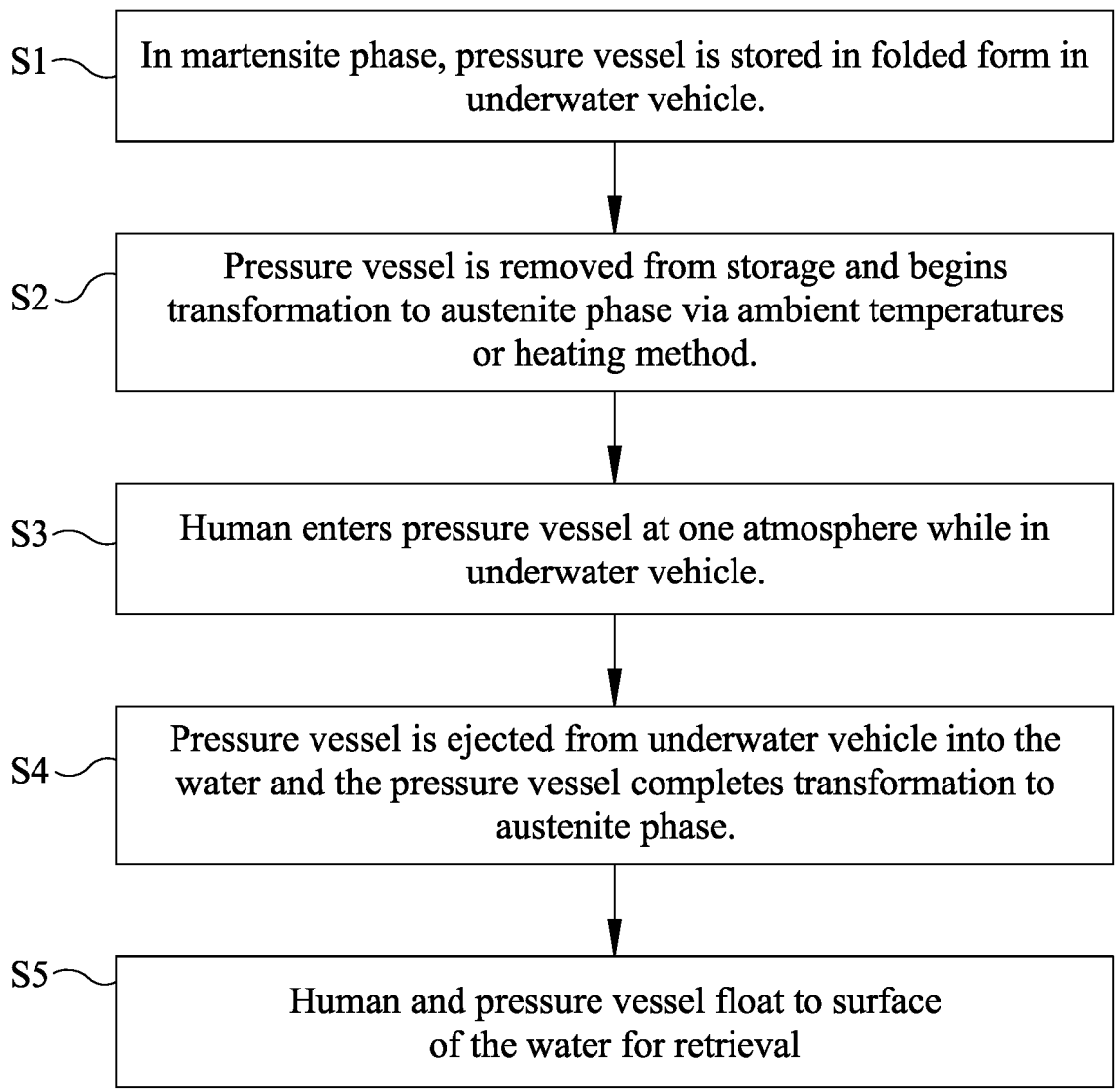
FIG. 4 is a flow chart for a method of use of a shape memory alloy emergency pressure vessel.

FIG. 4 is a flow chart illustrating a method of using the shape memory alloy pressure vessel 100. In step S1, in the martensite phase, the pressure vessel 100 is stored in folded form in an underwater vehicle. In step S2, the pressure vessel 100 is removed from storage and begins transformation to the austenite phase via ambient temperature or by a heating method. In step S3, a human enters the pressure vessel 100 at one atmosphere pressure while in the underwater vehicle. In step S4, the pressure vessel 100 is ejected from the underwater vehicle into water and the pressure vessel completes transformation to the austenite phase. In step S5, the human and the pressure vessel 100 float to the surface of the water for retrieval.

Figure 5:
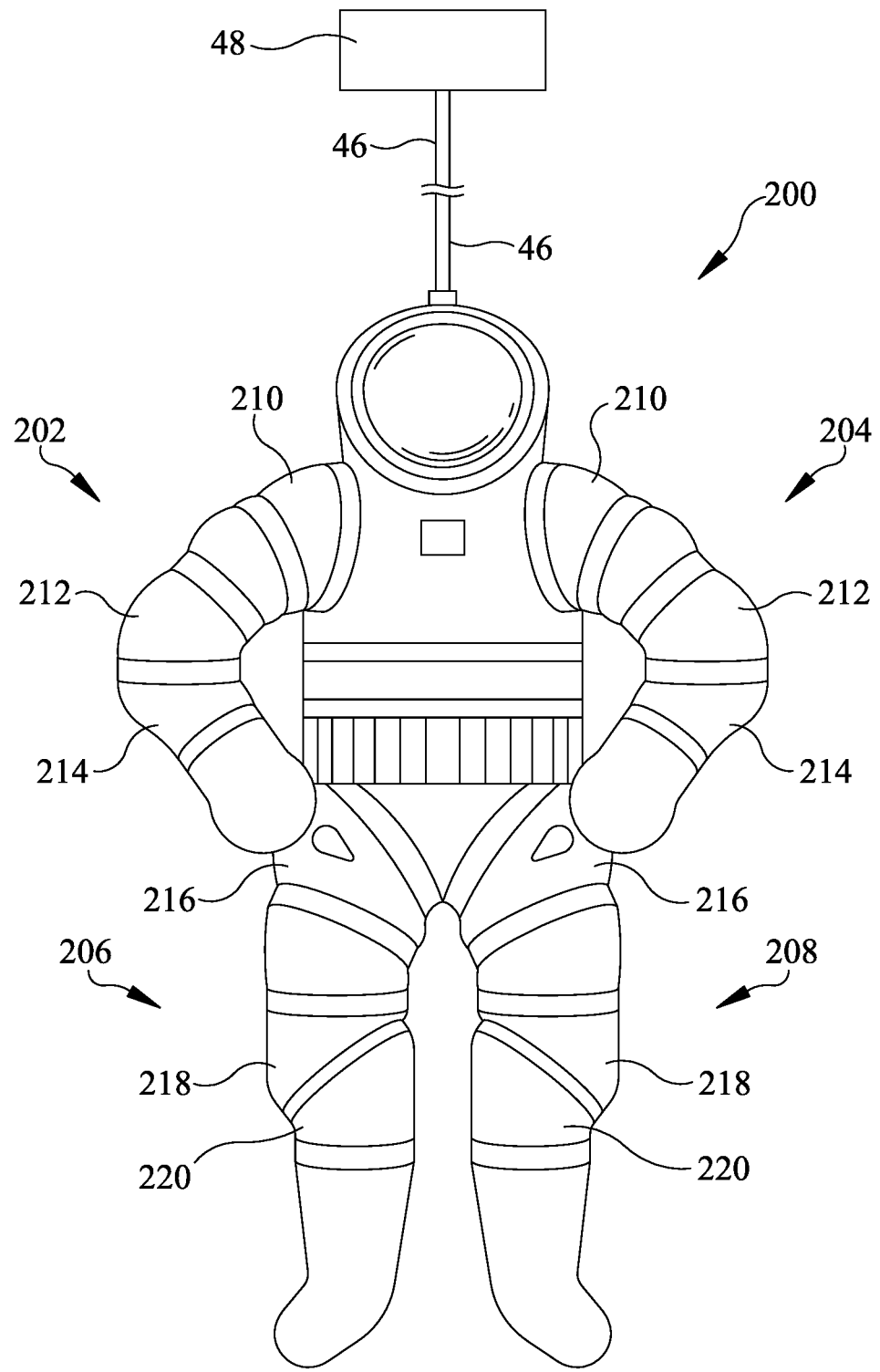
FIG. 5 is a hybrid atmospheric diving suit with shape memory alloy composite fabric joints.

FIG. 5 is a hybrid atmospheric diving suit 200 including shape memory alloy composite fabric joints. The hybrid atmospheric diving suit 200 has at least one joint in each of a right arm, a left arm, a right leg and a left leg portion of the diving suit. In the hybrid atmospheric diving suit 200, one or more shape memory alloy composite fabric joints substitute for one or more of the conventional atmospheric diving suit joints.

There is at least one shape memory alloy composite fabric joint in at least one of the limb portions 202, 204, 206, or 208. There also may more than one shape memory alloy composite fabric joint in each limb portion 202, 204, 206 and 208. In the illustrated atmospheric diving suit 200, there are three shape memory alloy composite fabric joints 210, 212 and 210 in each arm (limb) portion 202 and 204. There are three shape memory alloy composite fabric joints 216, 218 and 220 in each leg (limb) portion 206 and 208. In another embodiment, all of the joints in all of the limb portions 202, 204, 206 and 208 are shape memory alloy composite fabric joints.

The shape memory alloy composite fabric joints incorporated into the hybrid diving suit 200 offer a logistically minimalist compromise between the long-duration benefits of the conventional atmospheric diving suit 26 and the freedom of movement enjoyed by conventional ambient pressure divers at intermediate depths (25 to 185 meter depths). During long transits at depth, a diver may be held at atmospheric pressure (and temperature) by the hybrid diving suit 200. During the long transits at depth, the shape memory alloy composite fabric joints are rigid in the austenite phase to maintain a pressure of one atmosphere in the interior of the hybrid diving suit 200 while the human being transits underwater to and from an underwater work site. The transformation of the shape memory alloy composite fabric joints from martensite to austenite are affected by heat generated by electrical current supplied to the shape memory alloy wires or threads.

The electrical current may be supplied by the umbilical cable 46 or a battery pack mounted on the hybrid diving suit 200. Transformation of the shape memory alloy composite fabric joints from the austenite phase to the martensite phase are affected by reducing or eliminating the heat generated by the electrical current and subsequent cooling of the surrounding water.

During underwater transit to an underwater operations area or work site; the shape memory alloy joints may be in the austenite phase and the internal suit pressure at one atmosphere. Upon arrival at the work site, the shape memory alloy composite fabric joints in the hybrid diving suit 200 cool and transform from the austenite phase to the martensite phase. The internal suit pressure equalizes with the external ambient water pressure.

As the shape memory alloy composite fabric joints transform to the martensite phase, the joints become flexible enough to enable freedom of movement in the joints while the diver is underwater at the work site. The pressure in the hybrid diving suit 200 is equal to the ambient water pressure outside the diving suit. During transit, the diver decompresses in the same hybrid diving suit 200 by transforming the SMA composite fabric joints to the austenite phase and providing a one atmosphere pressure in the diving suit.

The hybrid diving suit 200 supplies heat as a byproduct of transforming shape memory alloys from martensite to austenite, which helps to warm the diver. The increased flexibility offered by the shape memory alloy joints enables a diver to swim without the need for external thrusters. The hybrid diving suit 200 may also be used as an emergency decompression system.

Figure 6:
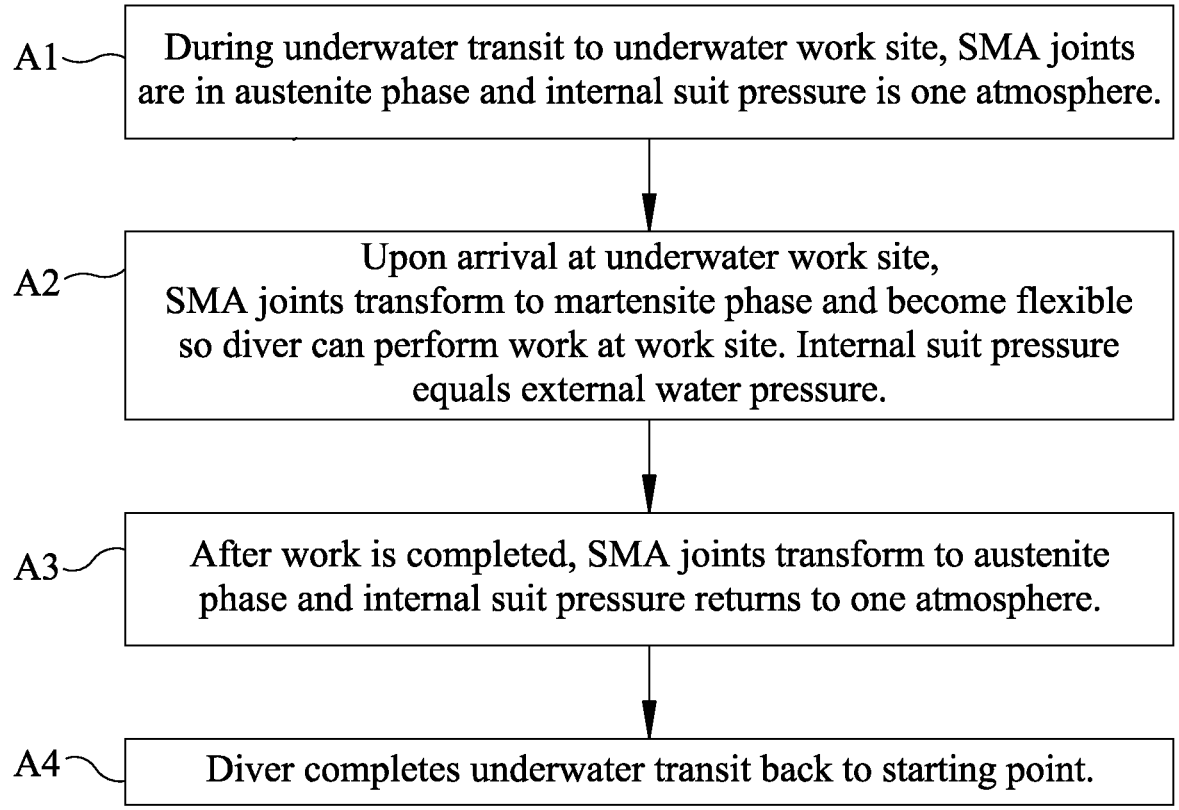
FIG. 6 is a flow chart of a method of use for diving using a hybrid atmospheric diving suit.

FIG. 6 is a flow chart illustrating a method of diving using the hybrid diving suit 200. In step A1, during underwater transit to underwater work site, shape memory alloy joints are in an austenite phase and internal suit pressure is one atmosphere. In step A2, upon arrival at the underwater work site, the shape memory alloy joints transform to the martensite phase and become flexible so that the diver can perform work at the work site. Internal suit pressure equals external water pressure. In step A3, after work is completed, the shape memory alloy joints transform to the austenite phase and internal suit pressure returns to one atmosphere. In step A4, the diver completes underwater transit back to a starting point.

As an emergency retrieval system, a diver may be retrieved from the working water depth by transforming the shape memory alloy composite joints to the austenite phase and maintaining a pressure inside the hybrid diving suit 200 equal to the ambient water pressure outside the diving suit at the working depth. Then, the diver moves upward to a surface of the water and is placed in a decompression chamber.

Figure 7:
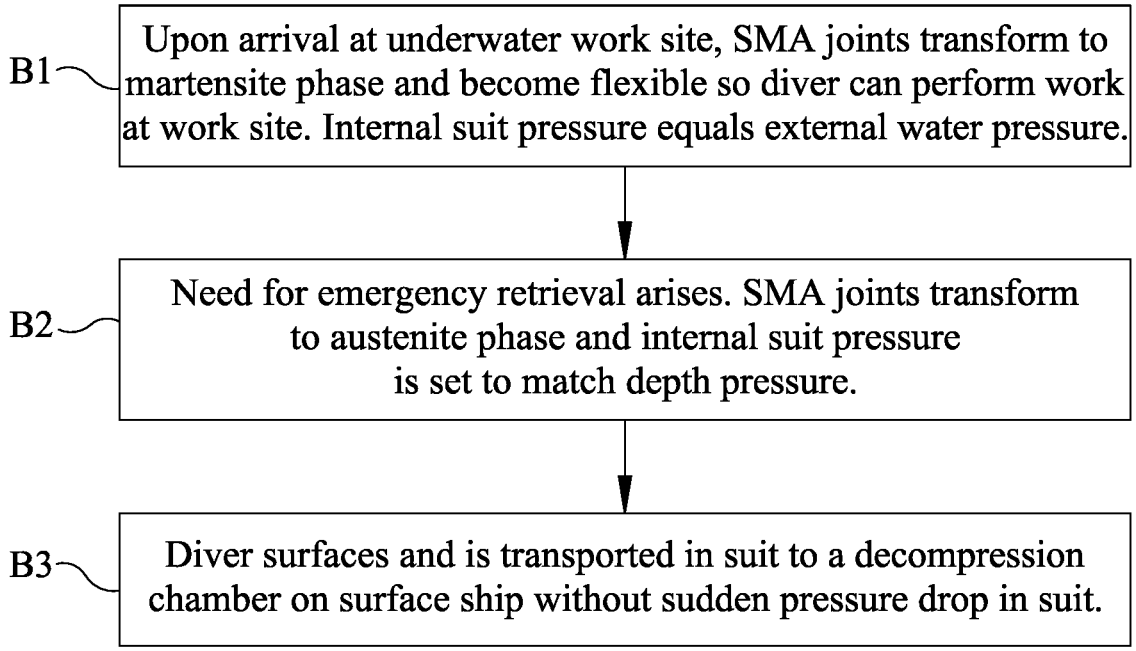
FIG. 7 is a flow chart of a method of use for emergency retrieval using the hybrid atmospheric diving suit.

FIG. 7 is a flow chart of a method of use for emergency retrieval using the hybrid diving suit 200. In step B1, upon arrival at the underwater work site, shape memory alloy joints transform to the martensite phase and become flexible so that the diver can perform work at the work site. Internal suit pressure equals external water pressure. In step B2, a need for emergency retrieval arises. The shape memory alloy joints transform to the austenite phase and internal suit pressure is set to match depth pressure. In step B3, the diver surfaces and is transported in hybrid diving suit 200 to a decompression chamber on a surface ship without a sudden pressure drop in the hybrid diving suit.

Figure 8:
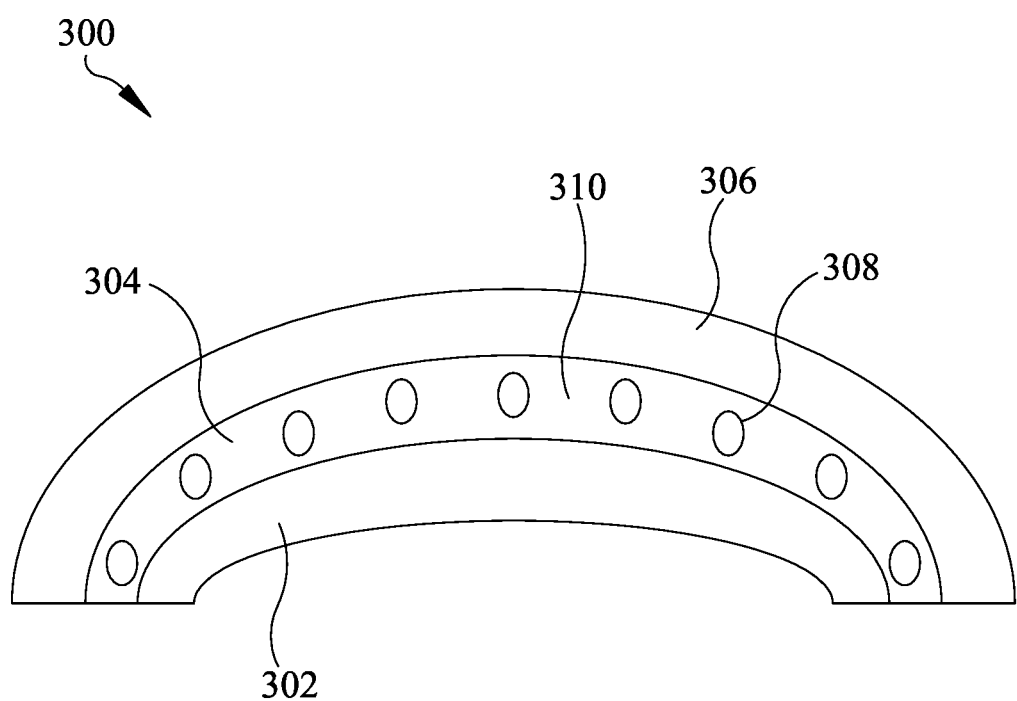
FIG. 8 is a cross-sectional view of shape memory alloy composite fabric used in the present invention.

FIG. 8 is a cross-sectional view of a shape memory alloy composite fabric 300. The composite fabric 300 is used to make the pressure vessel 100 and the joints 210, 212, 214, 216, 218, and 220. The fabric 300 includes an internal layer or dry suit 302, a shape memory alloy layer or pressure control layer 304 and an outer, waterproof layer 306. The internal layer 302 may include a thermally insulating, high temperature rated, moisture wicking material such as acrylic or wool. The internal layer 302 may include breathable layers and may also include an anti-microbial layer as well as being waterproof.

The shape memory alloy layer 304 includes SMA members 308 in the form of wires, threads, etc. Space between the SMA fibers 308 may need a filler 310. The filler 310 is a high temperature thermally insulating material such as blends of aramid fiber, novoloid fiber, fiber retardant cotton or wool serge. The outer waterproof layer 306 may be made of materials used in contemporary dry suits or immersion diving suits such as stockinette fabric covered with vulcanized rubber, nylon, polyurethane, breathable fabrics, or closed-cell foam such as neoprene. A bi-laminate or tri-laminate exterior shell may be used.

The shape memory alloy members 308 in the form of wires or threads may vary in cross-sectional diameter from 100 um to 3 millimeters. In addition, the SMA members 308 may be formed in shapes other than wires. However, it is essential that the shape memory alloy composite fabric 300 is water impermeable. The impermeability must hold against high-pressure gradients imposed by hydrostatic pressure at depth. These depths may be on the order of tens of times atmospheric or greater.

The shape memory alloy members 308 may be fitted into other fabrics, such as the filler 310 as part of the SMA layer 304. The shape memory alloy composite fabric 300 may be nonwoven, woven or knitted. A woven fabric is a textile that is created by interlacing warp and weft yarns. There are many different types of weaves that can be formed by differing the interlacing pattern, including the plain, twill and satin weave.

The shape memory alloy members 308 may be embedded in a textile structure by other methods such as stitching or knitting. The shape memory alloy members 308 may also be inserted between layers of fabric or other materials such that the members can move freely. The shape memory alloy members 308 may be sewn onto or into other layers of fabric or other materials. To increase the temperature of the shape memory alloy members 308 for transformation from martensite to austenite; the members or fibers may carry electrical current. The shape memory alloy fibers or members 308 may also be insulated to avoid overheating and increase efficiency.

The shape memory alloy must be trained to adapt a response to a final shape. The training may be performed before or after the integration of the shape memory alloy into the shape memory alloy members 308. If the training is after the integration into the shape memory alloy members 308; care must be taken that there is no damage by increases in the temperature necessary for the training.

The dry suit layer 302 and the waterproof layer 306 isolate the material that does not include the shape memory alloy. Strength members may be made of a variety of materials, including the shape memory alloy. The shape memory alloy members 308 may be woven with other non-SMA fabrics in various patterns, for example, spirals, radial rings, square or diamond mesh, zig-zags, or other weave patterns. Strength members may be added to help with radial and axial loading. For example, strength members made of high performance polymers such as Kevlar may be used for tensile loads and metal strength members may be used for loads in compression.

Strength members may be woven into the shape memory alloy composite fabric 300 or used separately. Strength members may have a variety of forms such as rings, coils, springs, and others. Individual shape memory alloy composite fabric joints may be terminated by rings that connect the joints to adjacent rigid components of an atmospheric diving suit or other SMA composite fabric joint sections.

Figure 9A:
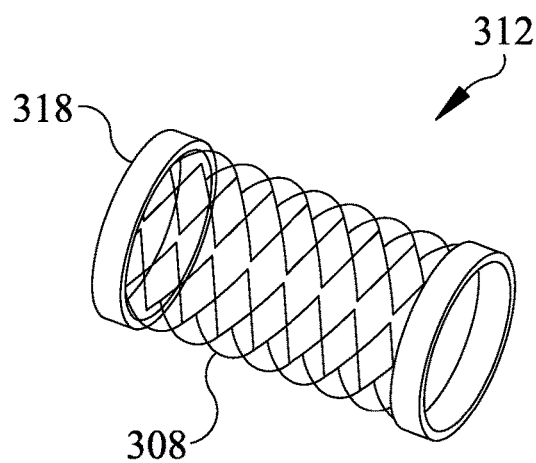
FIG. 9A is a first view of the shape memory alloy composite fabric joint of the present invention.
Figure 9B:
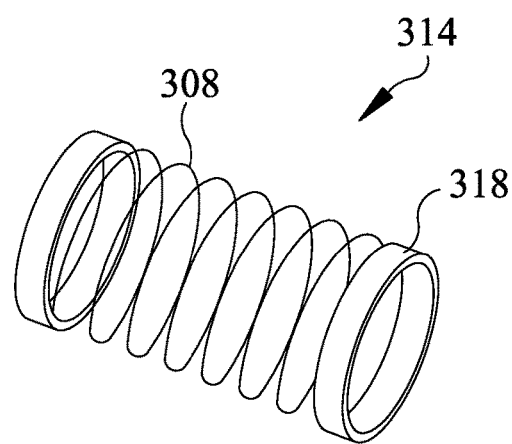
FIG. 9B is a second view of the shape memory alloy composite fabric joint.
Figure 9C:
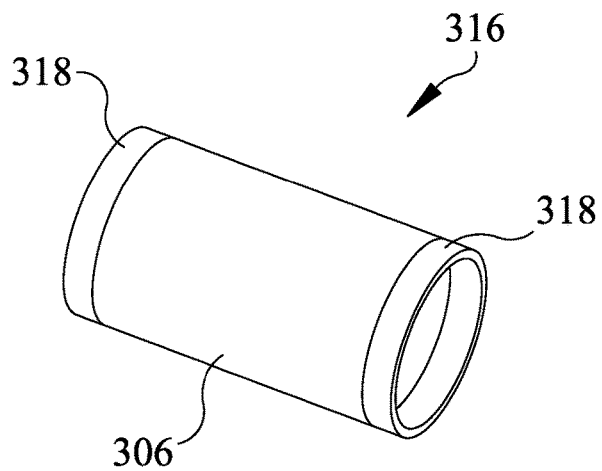
FIG. 9C is a third view of the shape memory alloy composite fabric joint.

FIG. 9A, FIG. 9B and FIG. 9C are examples of SMA composite fabric joints 312, 314 and 316. The joints 314 and 316 have the dry suit layer 302 and the waterproof layer 306 removed to show the SMA members or wires 308. The SMA wires 308 are fixed to rings 318 at each end. The rings 318 also provide an interface for connecting to other SMA joints and/or to the conventional joints of the hybrid atmospheric diving suit 200.

In FIG. 9A, the crisscross pattern of the SMA wires 308 in the fabric joint 312 resists tensile and compressive forces along the longitudinal axis the fabric joint. In FIG. 9B, the loop pattern of the SMA wires 308 in the fabric joint 312 resist radial forces applied toward the longitudinal axis of the fabric joint. FIG. 9C depicts the external waterproof layer 306.

Figure 10A:
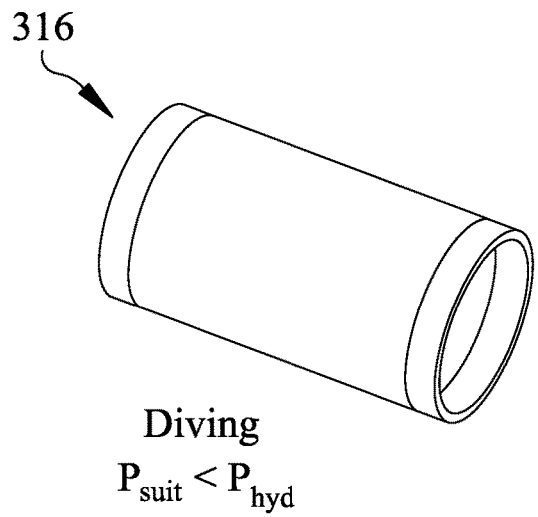
FIG. 10A illustrates a first operational mode of a shape memory alloy composite fabric joint of the present invention.
Figure 10B:
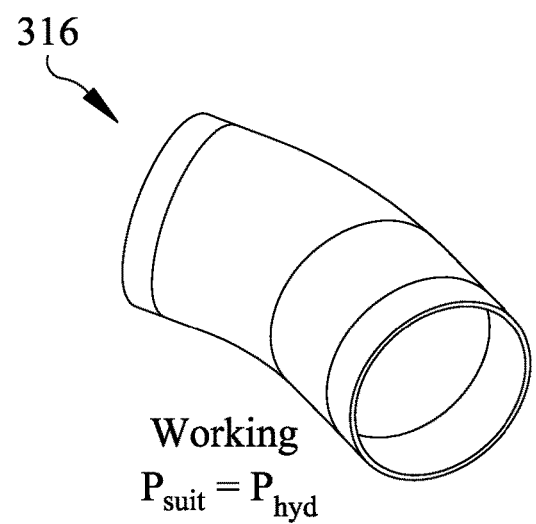
FIG. 10B illustrates a second operational mode of the shape memory alloy composite fabric joint.
Figure 10C:
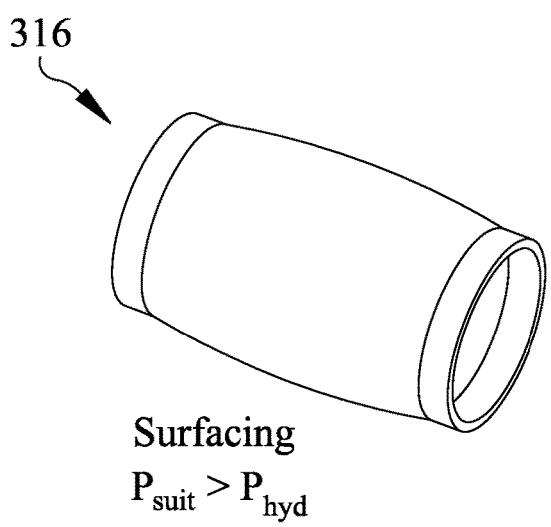
FIG. 10C illustrates a third operational mode of the shape memory alloy composite fabric joint.

FIG. 10A, FIG. 10B and FIG. 10C illustrate different examples of operational modes of a shape memory alloy composite fabric joint 316. In FIG. 10A, the fabric joint 316 is in the austenite phase, the pressure in the hybrid atmospheric diving suit 200 would be one atmosphere and the external pressure would be ambient hydrostatic pressure. This operation mode is where the diver transits underwater to and from a work site.

In FIG. 10B, the fabric joint 316 has transformed through cooling to the martensite mode and the fabric joint is flexible. This is the mode where the diver is working at the work site. In FIG. 10C, the fabric joint 316 has transformed to the austenite phase and the diver is retrieved to the water surface. In this mode, the pressure in the diving suit 200 is equal to the hydrostatic pressure at the depth where the diver was working and the external pressure is the ambient hydrostatic pressure as the diver ascends through the water.

Figure 1:
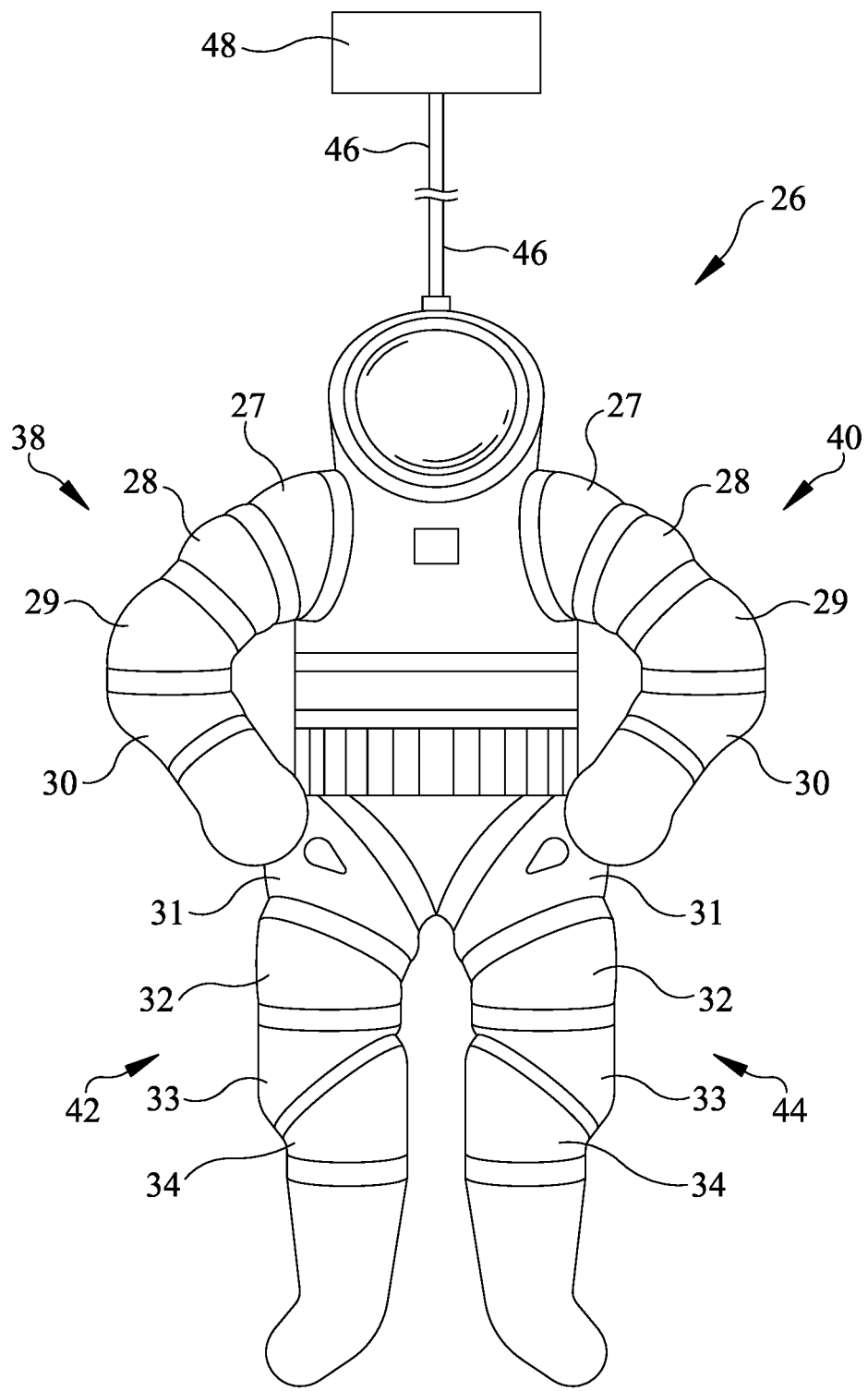
FIG. 1 is a diagram of a prior art atmospheric diving suit.
Figure 11A:
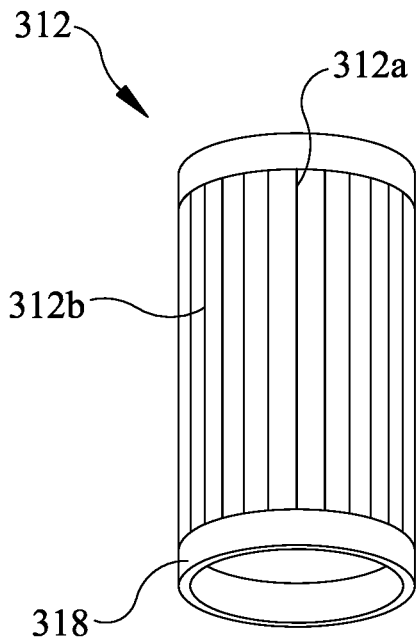
FIG. 11A illustrates a first example of a shape memory alloy composite fabric joint of the present invention.
Figure 11B:
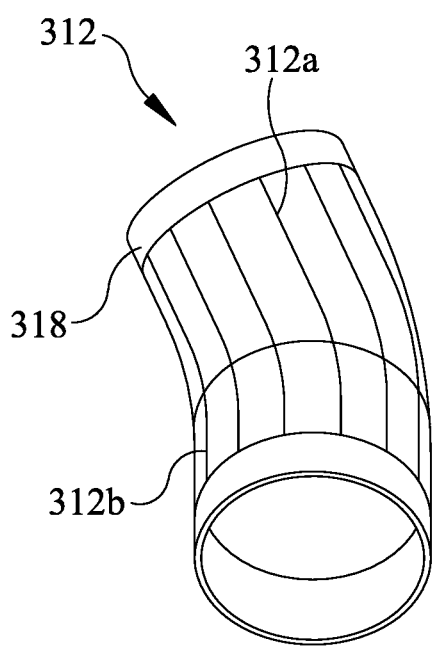
FIG. 11B illustrates a second example of a shape memory alloy composite fabric joint.

FIG. 11A and FIG. 11B illustrate the shape memory alloy composite fabric joint 312 that may be substituted for one or more of the conventional joints 27-30 and 31-34 in the conventional ADS 26 of FIG. 1. In the figures, the example joint 312 is shown without the external waterproof layer for purposes of clarity. In the joint 312, some of the individual shape memory alloy components or members differ in type from one another. FIG. 11A and FIG. 11B depict two different types of SMA members 312a and 312b although the number of different types of SMA members in a single joint may be greater than two.

Figure 11C:
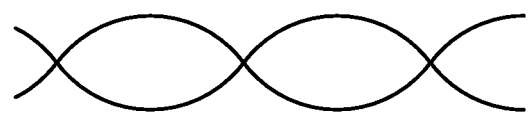
FIG. 11C depicts a first exemplary shape in a shape memory alloy joint.
Figure 11D:
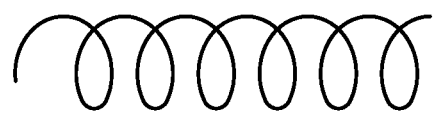
FIG. 11D depicts a second exemplary shape in the shape memory alloy joint.
Figure 11E:
FIG. 11E depicts a third exemplary shape in the shape memory alloy joint.

The SMA members 312a and 312b may be wires with different diameters or lengths or wires formed in a helical shape (FIG. 11C), a coiled shape (FIG. 11D), a zig zag shape (FIG. 11E), or other shapes that lend better to different types of bending. The SMA members 312a and 312b may be combinations of wires of different diameter, material composition, and length and also SMA members that are of other shapes than wires.

By using one or more joints, the pressure in the hybrid diving suit 200 may be maintained at one atmosphere, even when a joint changes shape. This is possible because some of the SMA members remain rigid (austenite) to maintain the resistance to ambient hydrostatic pressure and some of the SMA members transform to martensite to allow the joint 312 to change shape. The SMA members in the austenite phase can tolerate some bending (under the yield strain) caused by the hydrostatic pressure.

The phase changes of the varying types of shape memory alloy members may be controlled by a programmed computer. The computer can be programmed to send commands to transform the various SMA members from austenite to martensite and back to austenite as needed to maintain a pressure resistant joint while simultaneously allowing the joint to change shape. The computer may be activated by voice commands from the diver and/or by encoders on the various joints (shoulder, elbow, wrist) that sense a change in the angle of the limb portion.

The details, materials, steps and arrangement of parts have been described and illustrated to explain the nature of the invention. It will be understood that many changes in the details, materials, steps and arrangement of parts may be made by those skilled in the art, within the principle and scope of the invention, as expressed in the appended claims and equivalents thereof.

What is claimed is:

1. A pressure vessel for underwater use, said pressure vessel comprising:
   a shape memory alloy composite fabric;
   wherein said composite fabric has a martensite phase such that said composite fabric is elastic;
   wherein said composite fabric has an austenite phase such that said composite fabric is rigid and such that the austenite phase defines an interior volume of said pressure vessel with the composite fabric having a strength capable of withstanding an ambient hydrostatic pressure at a water depth where said pressure vessel is deployed.

2. The pressure vessel of claim 1, wherein the austenite phase of said shape memory alloy composite fabric is sustainable at temperatures in the range of 4 to 20 degrees Centigrade.

3. The pressure vessel of claim 1, wherein the martensite phase of said shape memory alloy composite fabric is sustainable at temperatures in the range of 4 to 20 degrees C. and said shape memory alloy composite fabric is heated above 20 degrees C. to transform to the austenite phase.

4. The pressure vessel of claim 1, wherein a pressure in the austenite phase inside said vessel is approximately one atmosphere.

5. A method of use for a pressure vessel with a shape memory alloy composite fabric, said method comprising the steps of:
 transforming the pressure vessel from a martensite phase to an austenite phase in an underwater vessel containing the pressure vessel;
 placing a human being in the pressure vessel at a pressure of one atmosphere;
 launching the pressure vessel from the underwater vessel with the human being inside; and
 floating the pressure vessel to a water surface while maintaining the pressure of one atmosphere in the pressure vessel.

6. A hybrid one-person articulated anthropomorphic submersible diving suit, said suit comprising:
 a plurality of joints in each of a right arm, a left arm, a right leg and a left leg of said suit; and
 at least one of said plurality of joints in at least one of said right arm, said left arm, said right leg and said left leg includes a shape memory alloy composite fabric;
 wherein said shape memory alloy composite fabric joints are rigid in an austenite phase to maintain a pressure of one atmosphere in an interior of said suit.

7. The suit in accordance with claim 6, wherein said shape memory alloy composite fabric joints are flexible in a martensite phase to enable freedom of movement in said fabric joints.

8. A method of use for a hybrid one-person articulated anthropomorphic submersible diving suit wherein the suit includes a plurality of joints in each of a right arm, a left arm, a right leg and a left leg of the suit and at least one of the plurality of joints in at least one of the right arm, the left arm, the right leg and the left leg includes a shape memory alloy composite fabric, said method of use comprising the steps of:
 maintaining the at least one of the plurality of composite fabric joints in an austenite phase to maintain a pressure in the suit at one atmosphere; and
 transiting a human being underwater within the suit to an underwater work site.

9. The method of claim 8, said method further comprising the steps of:
 transforming the at least one of the plurality of composite fabric joints to a martensite phase and;
 maintaining the pressure in the suit equal to ambient water pressure outside the suit while the human being is underwater at the work site to enable freedom of movement in the composite fabric joints.

10. The method of claim 9, said method further comprising the steps of:
 transforming the at least one of the plurality of composite fabric joints to the austenite phase; and
 maintaining the pressure in the suit at one atmosphere while the human being is transiting underwater away from the work area.

11. The method of claim 10, said method further comprising the steps of:
 retrieving the human being from a working water depth by transforming the at least one of the plurality of composite fabric joints to the austenite phase;
 maintaining the pressure inside the suit equal to an ambient water pressure value outside the suit at the working depth; and
 subsequently moving the human being upward to a water surface.

* * * * *